US011467779B2

(12) United States Patent
Litke et al.

(10) Patent No.: US 11,467,779 B2
(45) Date of Patent: Oct. 11, 2022

(54) DYNAMIC STORAGE PROVISIONING FOR NESTED CLUSTERS

(71) Applicant: Red Hat, Inc., Raleigh, NC (US)

(72) Inventors: Adam G. Litke, Harrisburg, PA (US); Huamin Chen, Westford, MA (US); Alexander G. P. Wels, Columbia, MD (US); David Vossel, Nashville, TN (US)

(73) Assignee: Red Hat, Inc., Raleigh, NC (US)

( * ) Notice: Subject to any disclaimer, the term of this patent is extended or adjusted under 35 U.S.C. 154(b) by 111 days.

(21) Appl. No.: 17/127,276

(22) Filed: Dec. 18, 2020

(65) Prior Publication Data

US 2022/0197567 A1 Jun. 23, 2022

(51) Int. Cl.
*G06F 3/06* (2006.01)
*G06F 9/455* (2018.01)

(52) U.S. Cl.
CPC ............ *G06F 3/067* (2013.01); *G06F 3/0604* (2013.01); *G06F 3/0617* (2013.01); *G06F 3/0631* (2013.01); *G06F 3/0665* (2013.01); *G06F 3/0667* (2013.01); *G06F 9/45558* (2013.01); *G06F 2009/45583* (2013.01)

(58) Field of Classification Search
CPC ...... G06F 3/0664; G06F 3/0604; G06F 3/065; G06F 3/0652; G06F 3/067; G06F 9/45558; G06F 2009/45583; G06F 3/0665; G06F 3/0605; G06F 9/5077; G06F 3/061; G06F 2009/4557; G06F 11/3006; G06F 11/3034; G06F 3/0617; G06F 2009/45595; G06F 3/0631
See application file for complete search history.

(56) References Cited

U.S. PATENT DOCUMENTS

| 8,544,070 | B2 | 9/2013 | Mukkara et al. |
| 8,782,795 | B1 | 7/2014 | Field et al. |
| 10,326,845 | B1 | 7/2019 | Jaeger |
| 10,708,082 | B1 | 7/2020 | Bakiaraj et al. |
| 10,789,136 | B1 | 9/2020 | Ruslyakov et al. |

(Continued)

OTHER PUBLICATIONS

Pearson, Amartey, "Using overlay mounts with Kubernetes," https://itnext.io/using-overlay-mounts-with-kubernetes-960375c05959, Apr. 19, 2019, 8 pages.

*Primary Examiner* — Reginald G Bragdon
*Assistant Examiner* — Thanh D Vo
(74) *Attorney, Agent, or Firm* — Dority & Manning, P.A.

(57) ABSTRACT

Dynamic storage provisioning for nested clusters is disclosed. A hosted cluster (HC) storage provisioner, executing in a hosted cluster that is hosted by an infrastructure cluster (IC), receives a request to dynamically provision a hosted cluster (HC) persistent volume object that is coupled to a physical storage. The HC storage provisioner causes an IC control plane executing on the IC to generate IC volume metadata that is backed by a storage volume on the physical storage. The HC storage provisioner determines that the IC volume metadata has been generated. The HC storage provisioner creates HC volume metadata on the hosted cluster that is linked to the IC volume metadata, the HC volume metadata comprising an HC persistent volume object that represents a persistent volume for use by the hosted cluster that is backed, via the IC volume metadata, by the physical storage.

20 Claims, 8 Drawing Sheets (56) References Cited

U.S. PATENT DOCUMENTS

2019/0058709 A1    2/2019  Kempf et al.
2020/0314006 A1   10/2020  Mackie et al.
2021/0255778 A1*   8/2021  Garewal ............... G06F 3/0673
2021/0311763 A1*  10/2021  Beard ....................... G06F 8/65
2021/0311792 A1*  10/2021  Rosoff .................. G06F 9/5077

* cited by examiner

DYNAMIC STORAGE PROVISIONING FOR NESTED CLUSTERS

BACKGROUND

A computer cluster can facilitate the automated deployment, management and scaling of applications in response to real-time demands.

SUMMARY

The examples disclosed herein implement dynamic storage provisioning for a hosted cluster via an infrastructure cluster such that the hosted cluster accesses physical storage only through the infrastructure cluster, and is not provided information about the physical storage that would enable the hosted cluster to otherwise access the physical storage, thus eliminating an ability for the hosted cluster to inadvertently or maliciously access other portions of the physical storage to which the hosted cluster was not granted access.

In one example a method is disclosed. The method includes receiving, by a hosted cluster (HC) storage provisioner executing in a hosted cluster that is hosted by an infrastructure cluster (IC), a request to dynamically provision a hosted cluster (HC) persistent volume object that is coupled to a physical storage for use by a virtual machine in the hosted cluster. The method further includes causing, by the HC storage provisioner, an IC control plane executing on the IC to generate IC volume metadata that is backed by a storage volume on the physical storage, the IC volume metadata comprising an IC persistent volume object that represents a persistent volume for use by the IC. The method further includes determining, by the HC storage provisioner, that the IC volume metadata has been generated. The method further includes creating, by the HC storage provisioner, HC volume metadata on the hosted cluster that is linked to the IC volume metadata, the HC volume metadata comprising an HC persistent volume object that represents a persistent volume for use by the hosted cluster that is backed, via the IC volume metadata, by the physical storage.

In one example a computing device is disclosed. The computing device includes a memory, and a processor device coupled to the memory to receive, via a hosted cluster (HC) storage provisioner executing in a hosted cluster that is hosted by an infrastructure cluster (IC), a request to dynamically provision a hosted cluster (HC) persistent volume object that is coupled to a physical storage for use by a virtual machine in the hosted cluster. The processor device is further to cause, by the HC storage provisioner, an IC control plane executing on the IC to generate IC volume metadata that is backed by a storage volume on the physical storage, the IC volume metadata comprising an IC persistent volume object that represents a persistent volume for use by the IC. The processor device is further to determine, by the HC storage provisioner, that the IC volume metadata has been generated. The processor device is further to create, by the HC storage provisioner, HC volume metadata on the hosted cluster that is linked to the IC volume metadata, the HC volume metadata comprising an HC persistent volume object that represents a persistent volume for use by the hosted cluster that is backed, via the IC volume metadata, by the physical storage.

In another example a non-transitory computer-readable storage medium is disclosed. The non-transitory computer-readable storage medium includes executable instructions to cause a processor device to receive, via a hosted cluster (HC) storage provisioner executing in a hosted cluster that is hosted by an infrastructure cluster (IC), a request to dynamically provision a hosted cluster (HC) persistent volume object that is coupled to a physical storage for use by a virtual machine in the hosted cluster. The instructions further cause the processor device to cause, by the HC storage provisioner, an infrastructure cluster (IC) control plane executing on the IC to generate IC volume metadata that is backed by a storage volume on the physical storage, the IC volume metadata comprising an IC persistent volume object that represents a persistent volume for use by the IC. The instructions further cause the processor device to determine, by the HC storage provisioner, that the IC volume metadata has been generated. The instructions further cause the processor device to create, by the HC storage provisioner, HC volume metadata on the hosted cluster that is linked to the IC volume metadata, the HC volume metadata comprising an HC persistent volume object that represents a persistent volume for use by the hosted cluster that is backed, via the IC volume metadata, by the physical storage.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A computer cluster can facilitate the automated deployment, management and scaling of applications in response to real-time demands. In some environments, it may be desirable for a computer cluster to provide compute nodes that can be used to host additional computer clusters. This may sometimes be referred to as "nested clusters." For example, a cloud computing environment provider may wish to have the benefits of a computer cluster, and customers of the cloud computing environment may wish to utilize the benefits of a computer cluster to host the customer's business processes. In such an environment, the cloud computing environment provider implements a first computer cluster (referred to herein as an infrastructure cluster for purposes of brevity), and one or more customers may each implement a hosted computer cluster (referred to herein as a hosted cluster for purposes of brevity), using the compute nodes of the infrastructure cluster to implement the hosted cluster.

A hosted cluster may need persistent storage at times. Due to security and privacy reasons, it may be undesirable for an infrastructure cluster provider to give a hosted cluster direct access to physical storage, especially where multiple different customers may utilize the same physical storage.

The examples disclosed herein implement dynamic storage provisioning for a hosted cluster via an infrastructure cluster such that the hosted cluster accesses physical storage only through the infrastructure cluster, and is not provided information about the physical storage that would enable the hosted cluster to otherwise access the physical storage, thus eliminating an ability for the hosted cluster to inadvertently or maliciously access other portions of the physical storage to which the hosted cluster was not granted access.

In one implementation, a hosted cluster dynamically requests a physical storage volume. A hosted cluster storage provisioner causes the infrastructure cluster to allocate a persistent volume on the physical storage, and generates infrastructure cluster (IC) volume metadata that is maintained on the infrastructure cluster, and that is backed by the persistent volume. Hosted cluster (HC) volume metadata is generated on the hosted cluster that refers to the IC volume metadata on the infrastructure cluster such that, to the hosted cluster, it appears a persistent volume has been allocated to the hosted cluster.

The hosted cluster may then receive a request for the persistent volume from a workload task executing on a virtual machine in the hosted cluster. The hosted cluster storage provisioner causes the infrastructure cluster to hotplug the IC volume metadata into the virtual machine, such that the virtual machine obtains a new volume that is backed by the persistent volume on the physical storage. The new volume can then be made available to the workload task, which can read and write to the persistent volume, but has no direct knowledge of any attributes of the physical storage, and thus cannot inadvertently or maliciously access other portions of the physical storage.

Figure 1A:
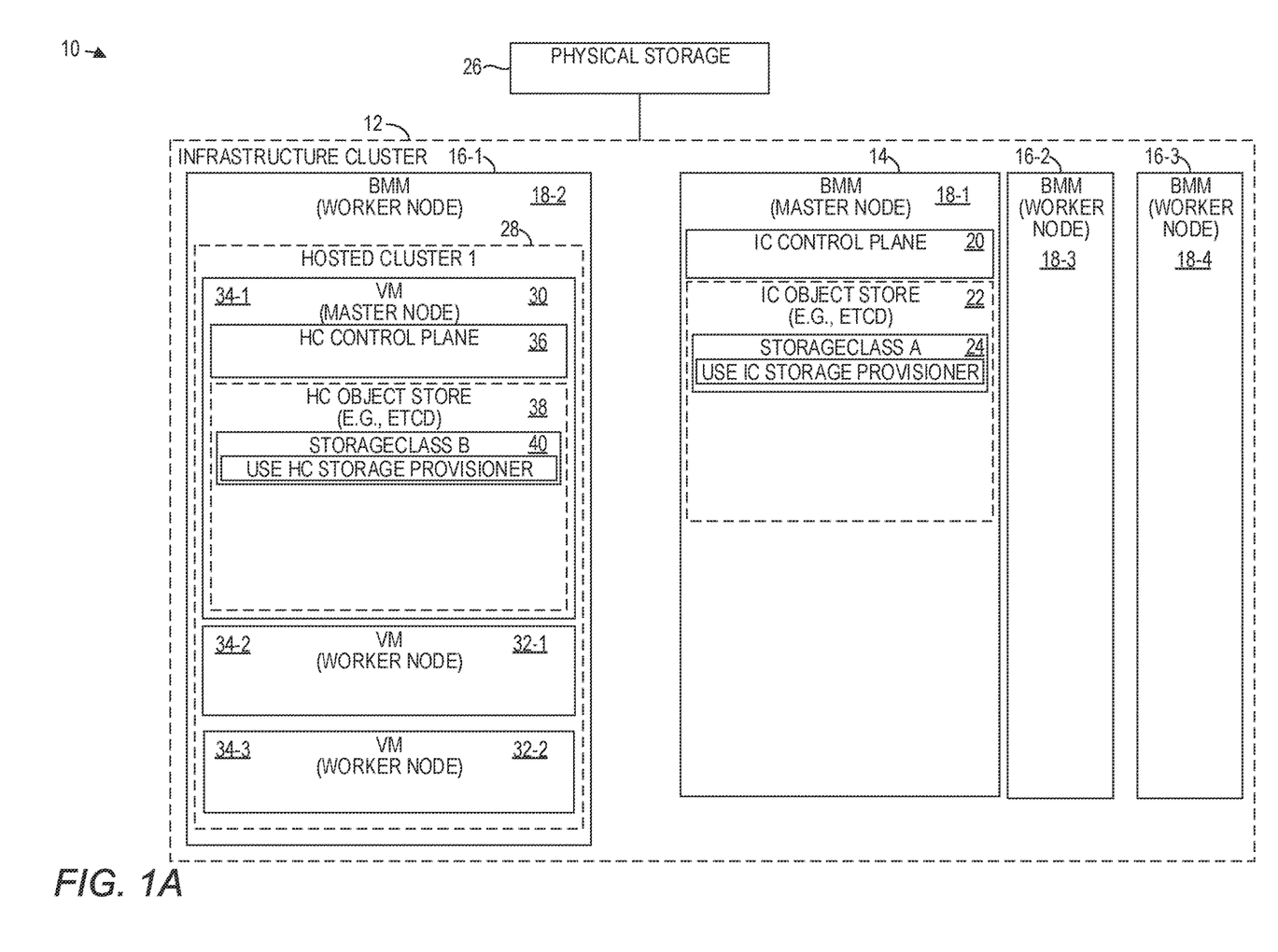
FIGS. 1A-1E illustrate an environment in which dynamic storage provisioning for nested clusters can be implemented, according to one example.

FIGS. 1A-1E illustrate an environment 10 in which dynamic storage provisioning for nested clusters can be implemented, according to one example. Referring first to FIG. 1A, the environment 10 includes an infrastructure cluster 12 that executes computer cluster software that implements a master node 14 and a plurality of worker nodes 16-1-16-3 (sometimes referred to as "compute nodes"). The computer cluster software may comprise any computer cluster software that implements a master node that facilitates and controls the initiation of workload tasks on a plurality of worker nodes. The workload tasks may comprise, by way of non-limiting example, virtual machines, pods, containers, or other processes. In some implementations, the computer cluster software comprises the Kubernetes® computer cluster software, available at Kubernetes.io, operating in conjunction with kubevirt, available at kubevirt.io, which implements the ability to implement virtual machines as a workload task using Kubernetes®.

In the implementation illustrated in FIG. 1A, the infrastructure cluster 12 comprises a plurality of computing devices 18-1-18-4, each of which comprises a processor device and a memory (not illustrated). The master node 14 is implemented on a bare metal machine (BMM) computing device 18-1, and not a virtual machine, and the worker nodes 16-1-16-3 are also implemented on individual BMM computing devices 18-2-18-4, rather than virtual machines.

The infrastructure cluster 12 includes an infrastructure cluster (IC) control plane 20 that controls the initiation of workload tasks on the worker nodes 16-1-16-3. While the IC control plane 20 is illustrated, solely for purposes of simplicity, as a single component implemented on the master node 14, in operation the IC control plane 20 can include multiple components, some of which may operate on the master node 14 and some of which operate on the worker nodes 16-1-16-3. In a Kubernetes® and kubevirt computer cluster implementation, the IC control plane 20 may include, by way of non-limiting example, an application programming interface (API) server component, a controller manager component, and a scheduler component that execute on the master node 14, and a kubelet component and virt-launcher component that execute on the worker nodes 16-1-16-3. However, the examples disclosed herein are not limited to any particular computer cluster software.

The infrastructure cluster 12 maintains metadata, referred to herein as objects, in an IC object store 22. While for purposes of illustration the IC object store 22 is illustrated as being on the master node 14, in operation the IC object store 22 is typically maintained on a persistent storage device, and copies of the objects in the IC object store 22 are brought into the memories of the computing devices 18-1-18-4 as requested by the IC control plane 20. In this example, the IC object store 22 includes a storage class object 24 that identifies a class of storage that may be dynamically requested in the infrastructure cluster 12. The term "dynamic" as used herein, such as in the phrase "dynamically requested," refers to a request originating from a task executing on a computing device 18-1-18-4, whether executing in the infrastructure cluster 12 or on a hosted cluster, as opposed to a human-initiated request, such as from an operator or other individual. As will be discussed in greater detail below, the storage class object 24 identifies an IC storage provisioner as the storage provisioner task that provisions the requested persistent storage.

In this example, the storage class object 24 corresponds to a physical storage 26 to which the infrastructure cluster 12 is communicatively coupled. The storage class object 24 facilitates the dynamic allocation of persistent volumes on the physical storage 26. While for purposes of illustration, only one physical storage 26 and one storage class object 24 are depicted, in operation, the infrastructure cluster 12 may be communicatively coupled to any number of different physical storages 26, each of which may or may not be a different type of physical storage. The infrastructure cluster 12 may also have a plurality of different storage class objects 24, each of which corresponds to a different storage class object 24, and facilitates the dynamic allocation of a persistent volume on the corresponding physical storage 26.

The infrastructure cluster 12 hosts a hosted cluster 28. The hosted cluster 28 comprises a master node 30 a plurality of worker nodes 32-1-32-2 (sometimes referred to as "compute nodes"). In this implementation, the master node 30 is implemented on a virtual machine ("VM") 34-1 that executes on the worker node 16-1 of the infrastructure cluster 12, and the worker nodes 32-1-32-2 are implemented on VMs 34-2-34-3, respectively, that are also implemented on the worker node 16-1 of the infrastructure cluster 12. While all the nodes 30, 32-1, 32-2 are illustrated as being implemented on the same worker node 16-1, in practice the nodes 30, 32-1, 32-2 could distributed across any of the worker nodes 16-1-16-3 of the infrastructure cluster 12. The term "virtual machine" as used herein refers to an emulation of a computer system that includes a processor device and memory and is implemented via virtualization software, such as, by way of non-limiting example keyboard, video, and mouse (KVM), Quick EMUlator (QEMU), VMware®, or the like. While not illustrated for purposes of simplicity, in a Kubernetes® environment, the VMs 34-1-34-3 may each be executing inside a separate Kubernetes® pod.

The hosted cluster 28 includes a hosted cluster (HC) control plane 36 that controls the initiation of workload tasks on the worker nodes 32-1-32-2. While the HC control plane 36 is illustrated, solely for purposes of simplicity, as a single component implemented on the master node 30, in operation the HC control plane 36 can include multiple components, some of which may operate on the master node 30 and some of which operate on the worker nodes 32-1-32-2. In a Kubernetes® computer cluster implementation, the HC control plane 36 may include, by way of non-limiting example, an API server component, a controller manager component, and a scheduler component that execute on the master node 30, and a kubelet component that executes on the worker nodes 32-1-32-2.

The hosted cluster 28 maintains metadata, referred to herein as objects, in an HC object store 38. While for purposes of illustration the HC object store 38 is illustrated as being on the master node 30, in operation the HC object store 38 is typically maintained on a persistent storage device, and copies of the objects in the HC object store 38 are brought into the memories of the virtual machines 34-1-34-3 as requested by the HC control plane 36. In this example, the HC object store 38 includes a storage class object 40 that identifies a class of persistent storage that may be dynamically requested in the hosted cluster 28. As will be discussed in greater detail below, the storage class object 40 identifies an HC storage provisioner as the storage provisioner task that provisions the requested persistent storage.

Figure 1B:
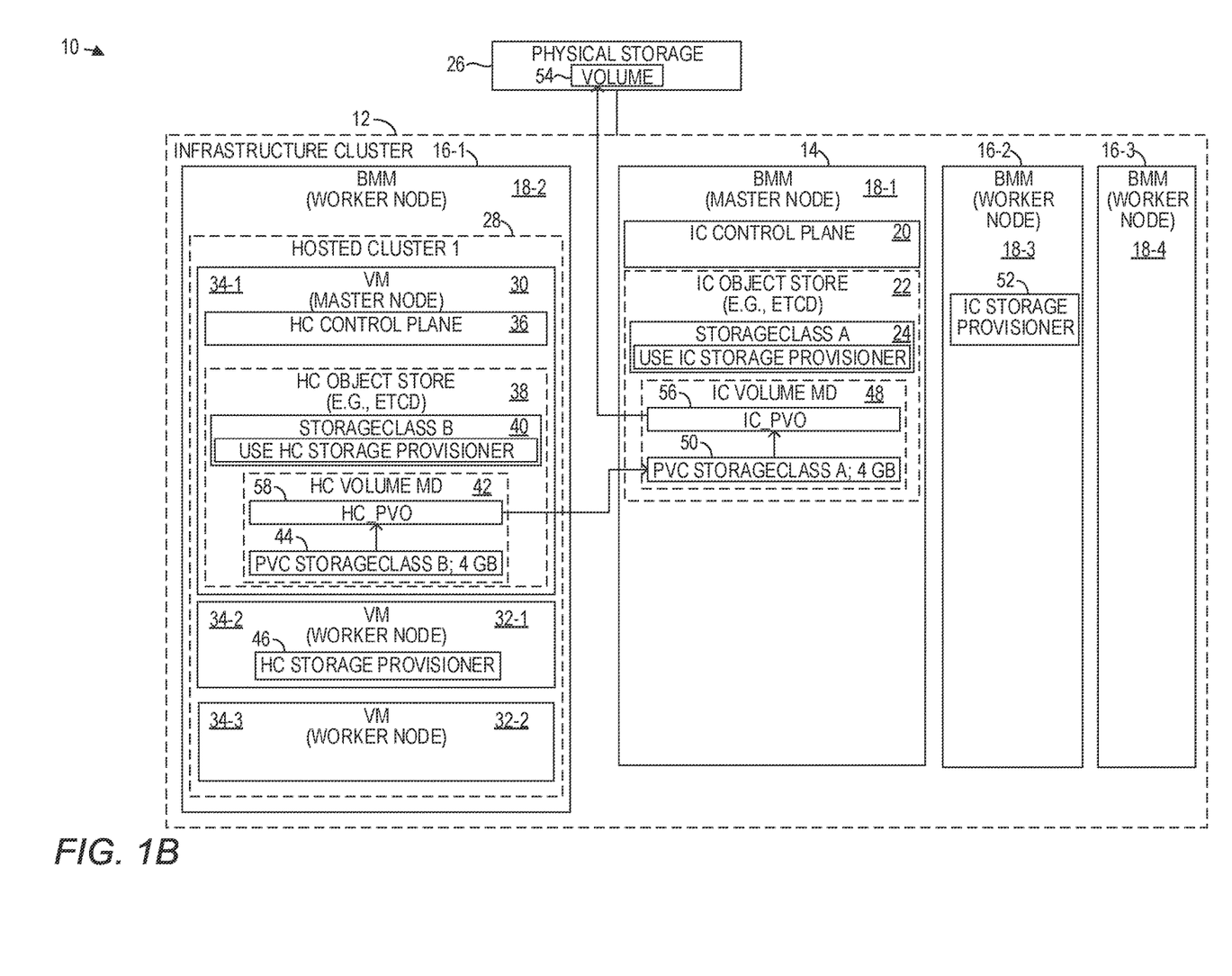

Referring now to FIG. 1B, assume that a configuration file is processed by the HC control plane 36 that contains a request to allocate a designated amount of persistent storage based on the storage class object 40. In a Kubernetes® environment, the configuration file may comprise a PersistentVolumeClaim keyword and identify the amount of storage, in this example, 4 gigabytes (GB), and identify the storage class object 40. In response, the HC control plane 36 generates HC volume metadata 42 that includes a persistent volume claim object 44 that identifies the storage class object 40 and the amount of requested storage.

The generation of the persistent volume claim object 44 causes a request to be sent to the storage provisioner identified in the storage class object 40, in particular the HC storage provisioner, to dynamically provision an IC persistent volume object that is coupled to the physical storage 26 for use by a virtual machine 34-2 or 34-3 in the hosted cluster 28. An HC storage provisioner 46 is initiated in the virtual machine 34-2. The HC storage provisioner 46 receives the request, and causes the IC control plane 20 to generate IC volume metadata 48. In one implementation, the IC control plane 20 generates a persistent volume claim object 50 that is congruent with the persistent volume claim object 44 in terms of the amount of storage, and any other attributes, such as read-only, read-write, or the like, and that identifies the storage class object 24. In some implementations, the HC storage provisioner 46 may cause the IC control plane 20 to generate the IC volume metadata 48 by calling a particular API offered by the IC control plane 20 for this purpose, and providing the IC control plane relevant information, such as the size of the persistent volume, and any other pertinent attributes associated with the persistent volume. For security reasons, the HC storage provisioner 46 may be limited to calling APIs of the IC control plane 20 that are in a same namespace as the hosted cluster 28.

The generation of the persistent volume claim object 50 causes a request to be sent to the storage provisioner identified in the storage class object 24, in particular the IC storage provisioner, to dynamically provision an IC persistent volume object that is coupled to the physical storage 26. An IC storage provisioner 52 is initiated on the worker node 16-2. The IC storage provisioner 52 receives the request, and provisions a persistent volume 54 on the physical storage 26 that is congruent in size with the requested amount of storage, in this example, 4 GB. The IC storage provisioner 52 generates an IC persistent volume object 56 that references the persistent volume 54. Because the IC persistent volume object 56 meets the requirements of the persistent volume claim object 50, the IC control plane 20 automatically binds the persistent volume claim object 50 to the IC persistent volume object 56.

The HC storage provisioner 46 determines that the IC volume metadata 48, which in this implementation includes the IC persistent volume object 56 and the persistent volume claim object 50, has been generated. In response, the HC storage provisioner 46 generates an HC persistent volume object 58 that references the IC volume metadata 48. Specifically, in some implementations, the HC persistent volume object 58 references the persistent volume claim object 50. The generation of the HC persistent volume object 58 appears to the HC control plane 36 as a persistent volume, and because the HC persistent volume object 58 meets the requirements of the persistent volume claim object 44, the HC control plane 36 automatically binds the persistent volume claim object 44 to the HC persistent volume object 58. At this point in time, it appears to the HC control plane 36 that the HC control plane 36 can allocate the persistent volume claim object 44 to any workload task in the hosted cluster 28 that requests a persistent volume via the persistent volume claim object 44.

Figure 1C:
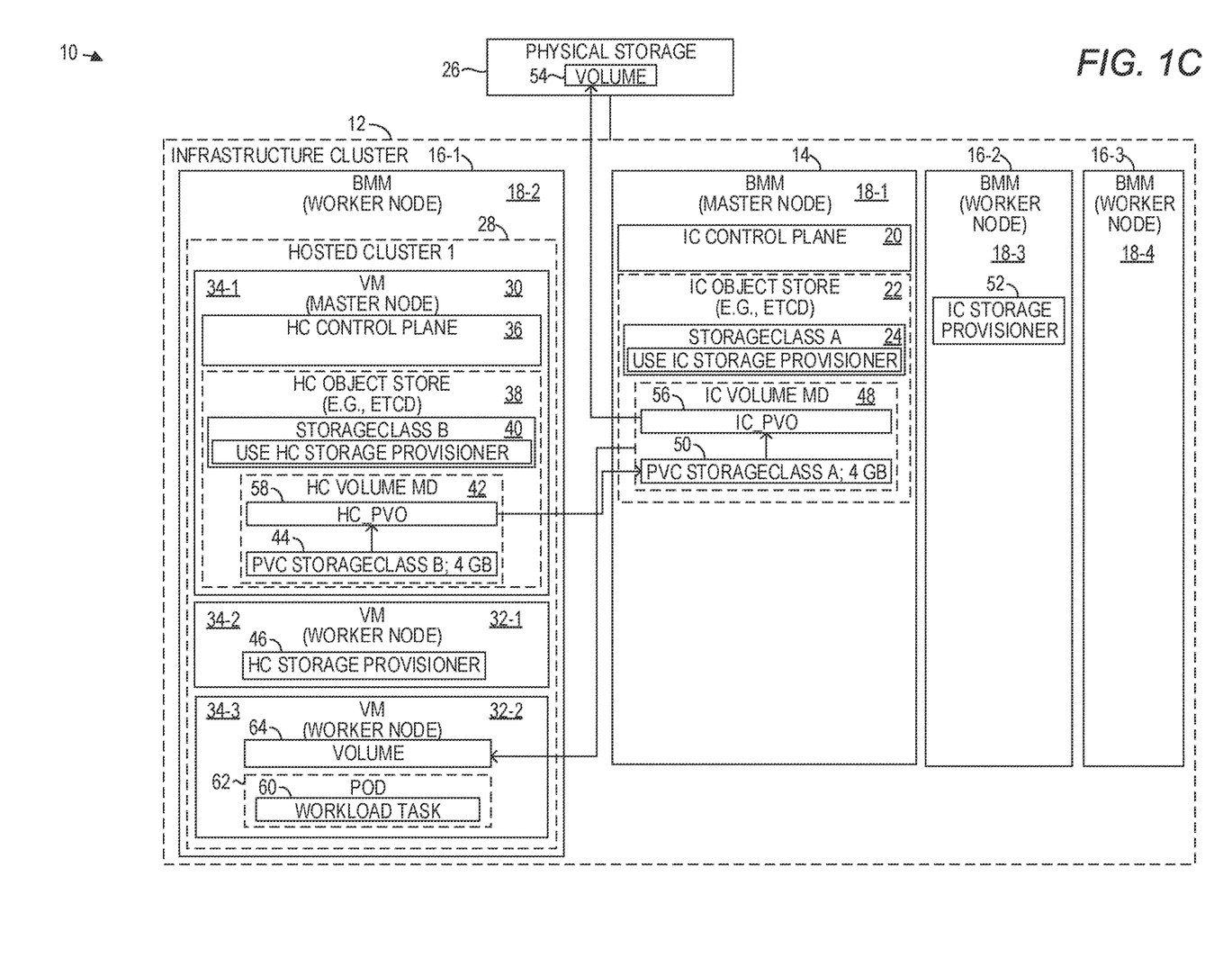

Referring now to FIG. 1C, assume that a workload task 60 is initiated on the worker node 32-2 that references the persistent volume claim identified in the persistent volume claim object 44. In a Kubernetes® environment, the workload task 60 may be initiated as part of a pod 62. In a Kubernetes® environment, the reference to the persistent volume claim may be in the pod specification that defines the pod 62. The HC control plane 36 requests the HC storage provisioner 46 to attach the HC persistent volume object 58 to the virtual machine 34-3. The HC storage provisioner 46 receives the request to attach the HC persistent volume object 58 to the virtual machine 34-3, and causes the IC control plane 20 to hot-plug the IC persistent volume object 56 into the virtual machine 34-3 via the IC volume metadata 48, such that the virtual machine 34-3 obtains a new volume 64 that is backed by the persistent volume 54 on the physical storage 26. Specifically, in some implementations, the HC storage provisioner 46 causes the IC control plane 20 to hot-plug the persistent volume claim object 50 into the virtual machine 34-3.

The particular hot-plug operation utilized by the IC control plane 20 may differ depending on the particular computer cluster software utilized; however, the hot-plug operation simulates, to the VM 34-3, the attachment of a drive to a computing device, such as, by way of non-limiting example, a Small Computer System Interface (SCSI) disk to a SCSI controller, such that the operating system of the computing device immediately recognizes the connection of the SCSI disk, and enters the SCSI disk into a list of available devices. It is noted that the examples are not limited to hot-plugging any particular type of drive, and can be used with any type of drive, including, by way of non-limiting example, virtio drives, serial advanced technology attachment (SATA) drives, and the like. The VM 34-3 thus detects the existence of the new volume 64 and, in response, uses conventional binding or mounting operations to make the new volume 64 available to the workload task 60, in some implementations via the pod 62. The new volume 64 is backed by the persistent volume 54 on the physical storage 26 via the persistent volume claim object 50 and the IC persistent volume object 56, such that any operations by the workload task 60 are stored on the persistent volume 54. However, neither the workload task 60 nor the VM 34-3 has any direct knowledge of any attributes of the physical storage 26, and thus cannot inadvertently or maliciously access portions of the physical storage 26 other than the persistent volume 54. Thus, other hosted clusters implemented on the infrastructure cluster 12 can safely implement another persistent volume on the physical storage 26 without fear of the hosted cluster 28 accessing such persistent volume.

Figure 1D:
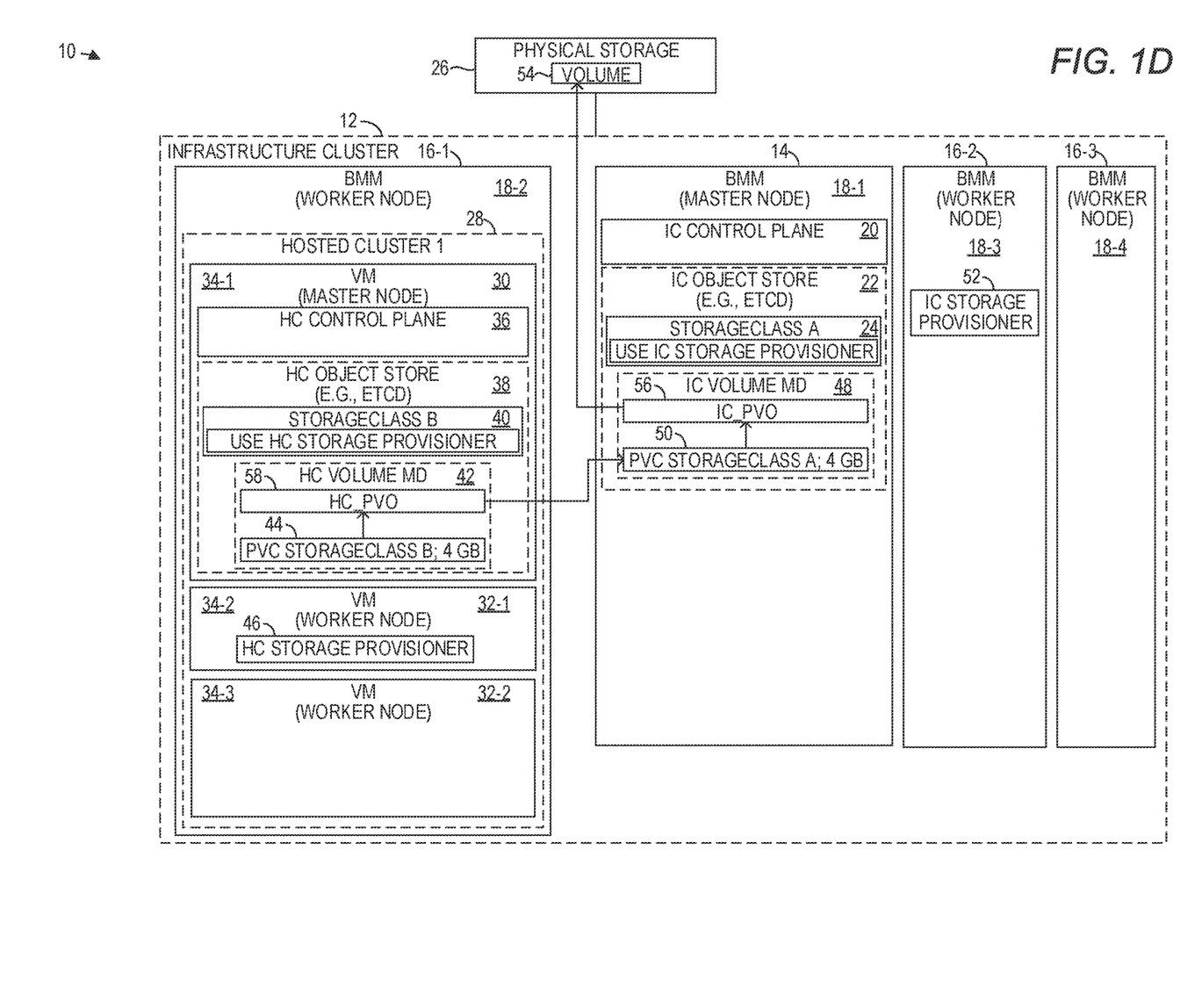
Figure 1E:
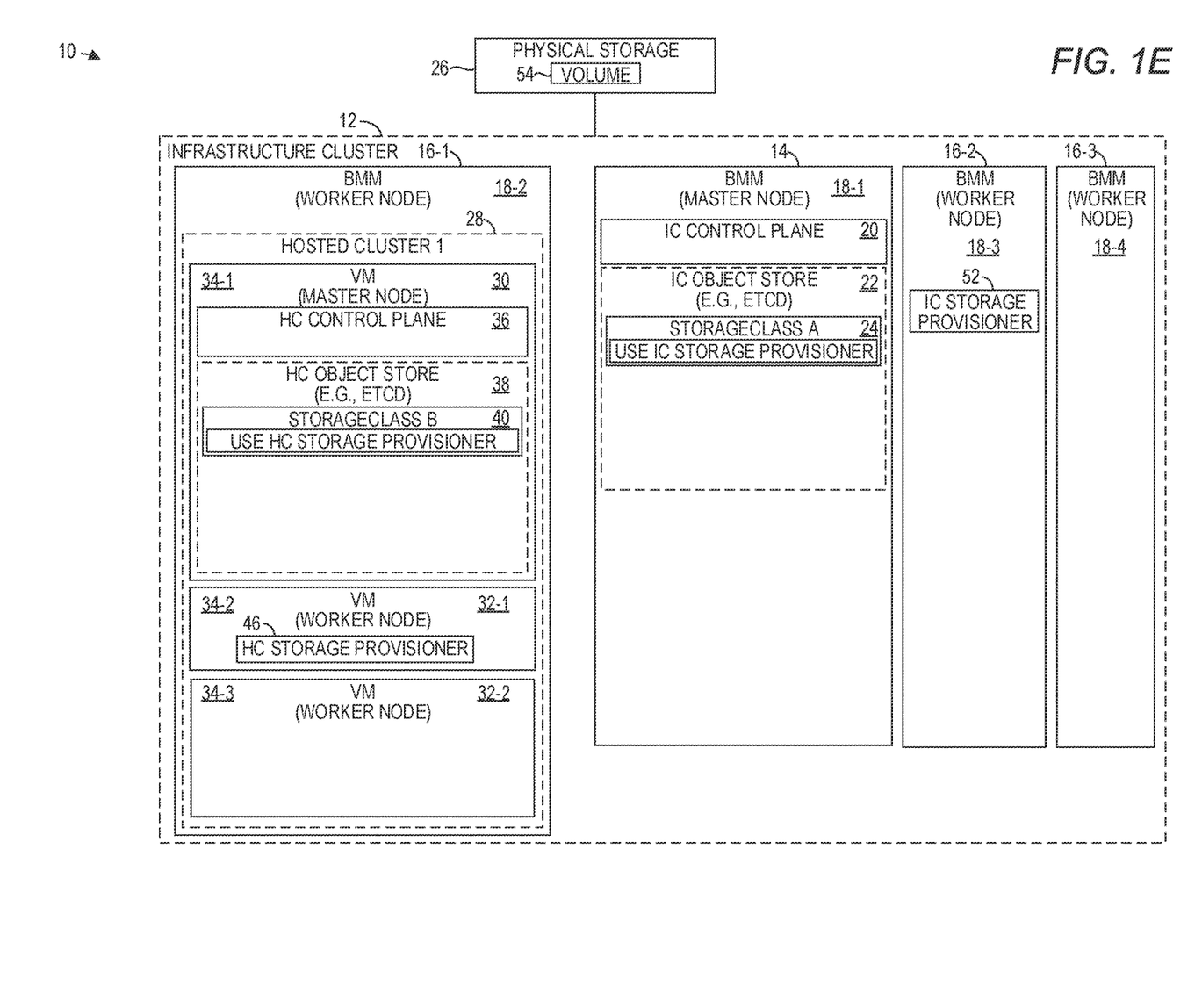

Referring now to FIG. 1D, assume that the workload task 60 terminates. The HC control plane 36 determines that the volume 64 (FIG. 1C) is no longer used by the virtual machine 34-3. The HC control plane 36 sends a request to the HC storage provisioner 46 to detach the volume 64 from the VM 34-3. The HC storage provisioner 46 receives the request, and causes the IC control plane 20 to hot-unplug the IC persistent volume object 56 from the VM 34-3 via the IC volume metadata 48, such that the virtual machine 34-3 no longer has the new volume 64. Specifically, in some implementations, the HC storage provisioner 46 causes the IC control plane 20 to hot-unplug the persistent volume claim object 50 from the virtual machine 34-3. Note that the HC storage provisioner 46 may maintain the HC volume metadata 42 so that if another workload task executes on the hosted cluster 28 and references the persistent volume claim identified in the persistent volume claim object 44, the HC storage provisioner 46 can repeat the process discussed above with regard to FIG. 1C.

Assume that the HC control plane 36 receives a request to delete the persistent volume claim object 44. The HC control plane 36 deletes the persistent volume claim object 44. This causes the HC storage provisioner 46 to cause the IC control plane 20 to delete the persistent volume claim object 50. The deletion of the persistent volume claim object 50 causes the IC storage provisioner 52 to delete the IC persistent volume object 56. The HC storage provisioner 46 deletes the HC persistent volume object 58, as reflected in FIG. 1E.

Figure 2:
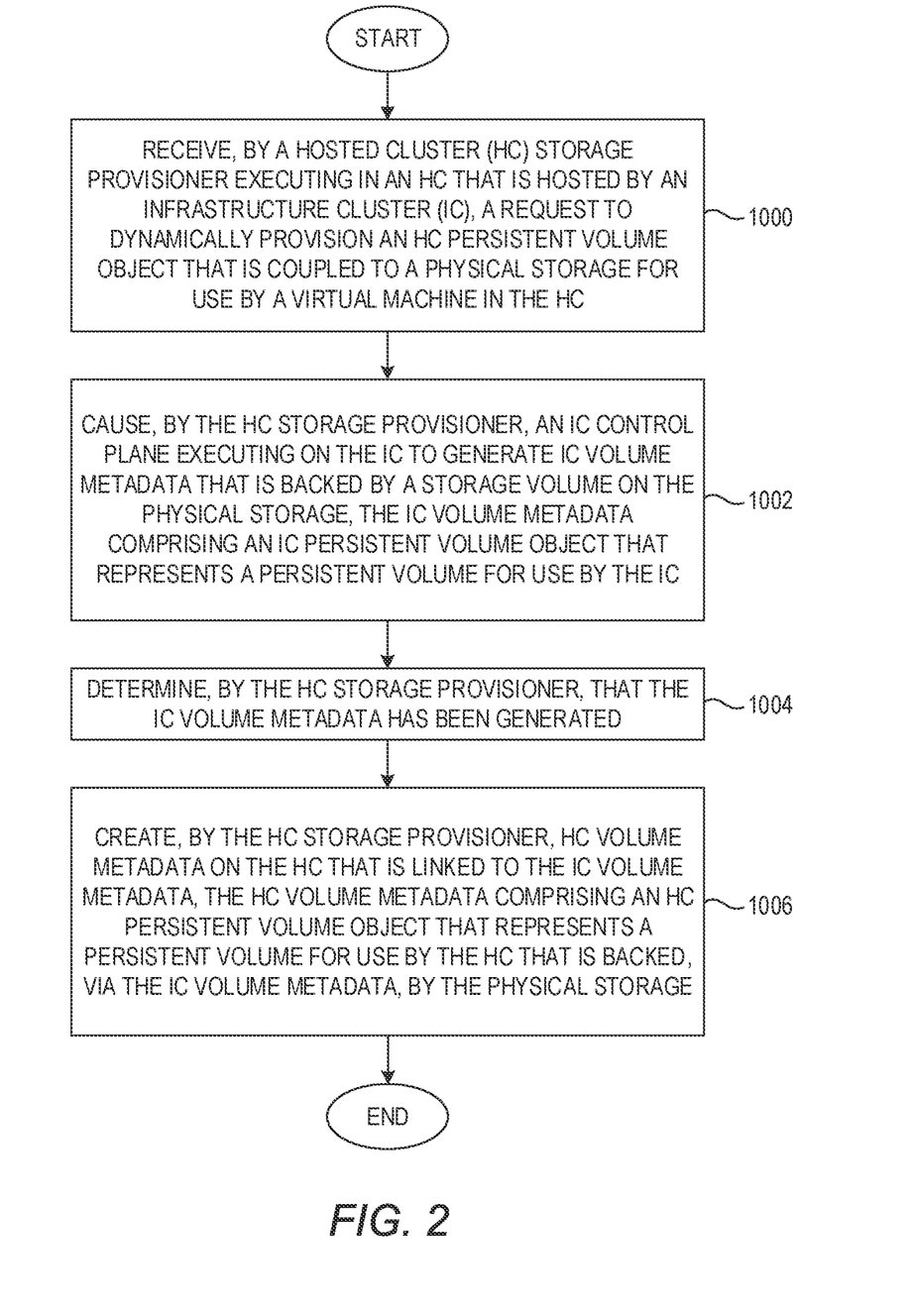
FIG. 2 is a flowchart of a method for dynamic storage provisioning for nested clusters, according to one example.

FIG. 2 is a flowchart of a method for dynamic storage provisioning for nested clusters, according to one example. FIG. 2 will be discussed in conjunction with FIG. 1B. The HC storage provisioner 46, executing in the hosted cluster 28 that is hosted by the infrastructure cluster 12, receives a request to dynamically provision the HC persistent volume object 58 that is coupled to the physical storage 26 for use by a virtual machine 34-2, 34-3 in the hosted cluster 28 (FIG. 2, block 1000). The HC storage provisioner 46 causes the IC control plane 20, executing on the infrastructure cluster 12, to generate the IC volume metadata 48 that is backed by the persistent volume 54 on the physical storage 26, the IC volume metadata 48 comprising the IC persistent volume object 56 that represents a persistent volume for use by the infrastructure cluster 12 (FIG. 2, block 1002). The HC storage provisioner 46 determines that the IC volume metadata 48 has been generated (FIG. 2, block 1004). The HC storage provisioner 46 creates the HC volume metadata 42 on the hosted cluster 28 that is linked to the IC volume metadata 48, the HC volume metadata 42 comprising the HC persistent volume object 58 that represents a persistent volume for use by the hosted cluster 28 that is backed, via the IC volume metadata 48, by the physical storage 26 (FIG. 2, block 1006).

Figure 3:
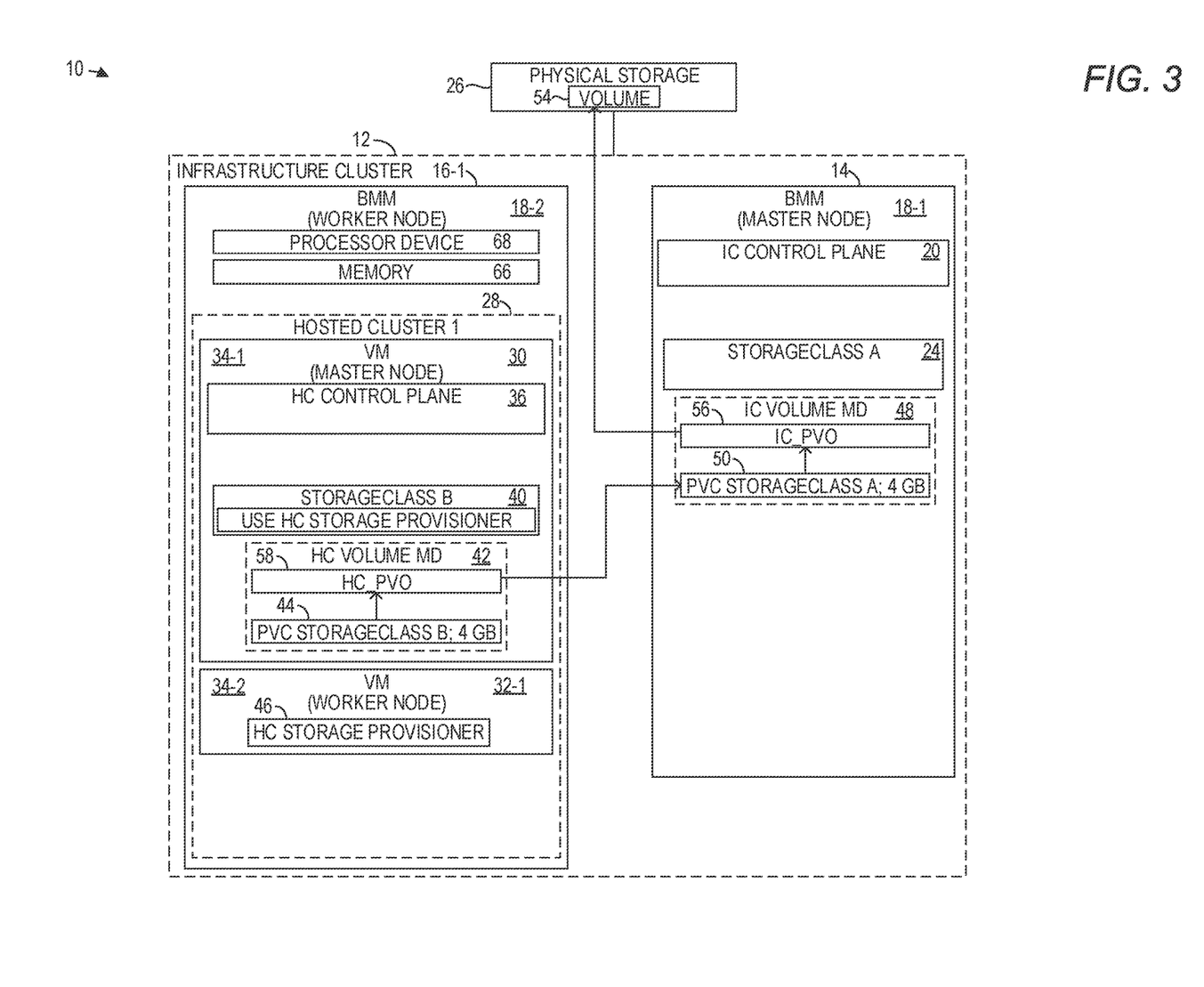
FIG. 3 is a simplified block diagram of the environment illustrated in FIG. 1, according to one example.

FIG. 3 is a simplified block diagram of the environment 10, according to one example. The environment 10 includes the computing device 18-2, which in turn includes a memory 66 and a processor device 68 coupled to the memory 66. The processor device 68 is to receive, via the HC storage provisioner 46, executing in the hosted cluster 28 that is hosted by the infrastructure cluster 12, a request to dynamically provision the HC persistent volume object 58 that is coupled to the physical storage 26 for use by a virtual machine 34-2, 34-3 in the hosted cluster 28. The processor device 68 is further to cause, via the HC storage provisioner 46, the IC control plane 20, executing on the infrastructure cluster 12, to generate the IC volume metadata 48 that is backed by the persistent volume 54 on the physical storage 26, the IC volume metadata 48 comprising the IC persistent volume object 56 that represents a persistent volume for use by the infrastructure cluster 12. The processor device 68 is further to determine, via the HC storage provisioner 46, that the IC volume metadata 48 has been generated. The processor device 68 is further to create, via the HC storage provisioner 46, the HC volume metadata 42 on the hosted cluster 28 that is linked to the IC volume metadata 48, the HC volume metadata 42 comprising the HC persistent volume object 58 that represents a persistent volume for use by the hosted cluster 28 that is backed, via the IC volume metadata 48, by the physical storage 26.

Figure 4:
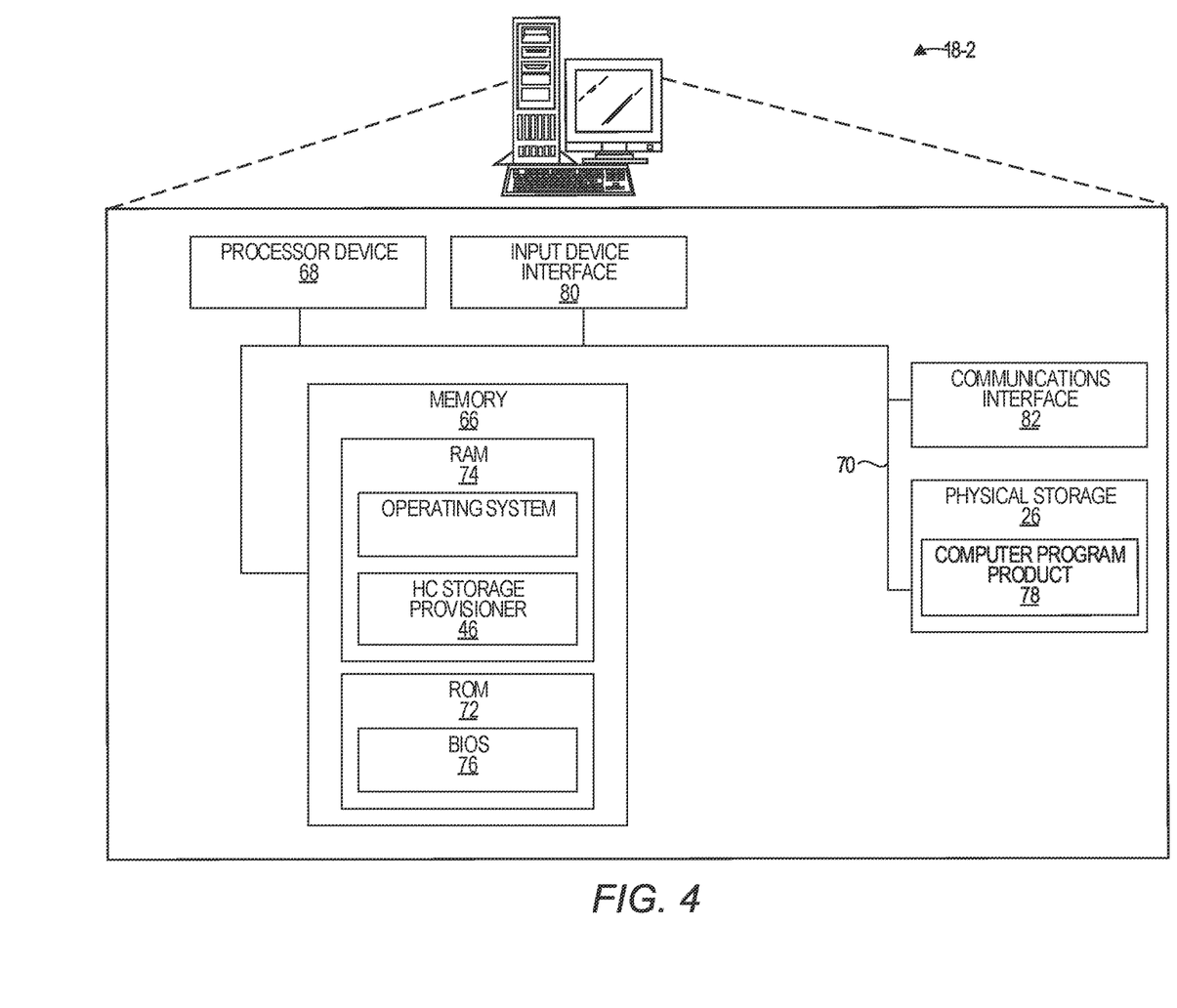
FIG. 4 is a block diagram of a computing device suitable for implementing dynamic storage provisioning for nested clusters, according to one example.

FIG. 4 is a block diagram of the computing device 18-2 suitable for implementing examples according to one example. The computing device 18-2 may comprise any computing or electronic device capable of including firmware, hardware, and/or executing software instructions to implement the functionality described herein, such as a computer server, a desktop computing device, a laptop computing device or the like. The computing device 18-2 includes the processor device 68, the system memory 66, and a system bus 70. The system bus 70 provides an interface for system components including, but not limited to, the system memory 66 and the processor device 68. The processor device 68 can be any commercially available or proprietary processor.

The system bus 70 may be any of several types of bus structures that may further interconnect to a memory bus (with or without a memory control plane), a peripheral bus, and/or a local bus using any of a variety of commercially available bus architectures. The system memory 66 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the computing device 18-2. The volatile memory 74 may also include a high-speed RAM, such as static RAM, for caching data.

The computing device 18-2 may further include or be coupled to a non-transitory computer-readable storage medium such as the physical storage 26, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. A number of modules can be stored in the physical storage 26 and in the volatile memory 74, including an operating system and one or more program modules, such as the HC storage provisioner 46, which may implement the functionality described herein in whole or in part. It is to be appreciated that the examples can be implemented with various commercially available operating systems or combinations of operating systems. In some implementations, the operating system comprises a Red Hat® Linux® operating system.

All or a portion of the examples may be implemented as a computer program product 78 stored on a transitory or non-transitory computer-usable or computer-readable storage medium, such as the physical storage 26, which includes complex programming instructions, such as complex computer-readable program code, to cause the processor device 68 to carry out the steps described herein. Thus, the computer-readable program code can comprise software instructions for implementing the functionality of the examples described herein when executed on the processor device 68.

An operator may also be able to enter one or more configuration commands through a keyboard (not illustrated), a pointing device such as a mouse (not illustrated), or a touch-sensitive surface such as a display device. Such input devices may be connected to the processor device 68 through an input device interface 80 that is coupled to the system bus 70 but can be connected by other interfaces such as a parallel port, an Institute of Electrical and Electronic Engineers (IEEE) 1394 serial port, a Universal Serial Bus (USB) port, an IR interface, and the like. The computing device 18-2 may also include a communications interface 82 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a hosted cluster (HC) storage provisioner executing in a hosted cluster that is hosted by an infrastructure cluster (IC), a request to dynamically provision a hosted cluster (HC) persistent volume object that is coupled to a physical storage for use by a virtual machine in the hosted cluster;
causing, by the HC storage provisioner, an IC control plane executing on the IC to generate IC volume metadata that is backed by a storage volume on the physical storage, the IC volume metadata comprising an IC persistent volume object that represents a persistent volume for use by the IC;
determining, by the HC storage provisioner, that the IC volume metadata has been generated; and
creating, by the HC storage provisioner, HC volume metadata on the hosted cluster that is linked to the IC volume metadata, the HC volume metadata comprising an HC persistent volume object that represents a persistent volume for use by the hosted cluster that is backed, via the IC volume metadata, by the physical storage.

2. The method of claim 1, further comprising:
receiving, by the HC storage provisioner, a request to attach the HC persistent volume object to a particular virtual machine of a plurality of virtual machines executing on the hosted cluster; and
causing, by the HC storage provisioner, the IC control plane to hot-plug the IC persistent volume object into the particular virtual machine via the IC volume metadata, such that the particular virtual machine obtains a new volume that is backed by the storage volume on the physical storage.

3. The method of claim 2 further comprising:
determining, by the HC storage provisioner, that the new volume is to be detached from the particular virtual machine; and
causing, by the HC storage provisioner, the IC control plane to hot-unplug the IC persistent volume object from the particular virtual machine via the IC volume metadata, such that the particular virtual machine no longer has the new volume that is backed by the storage volume on the physical storage.

4. The method of claim 3 wherein the HC storage provisioner, subsequent to causing the IC control plane to hot-unplug the IC persistent volume object from the particular virtual machine via the IC volume metadata, maintains the HC volume metadata.

5. The method of claim 2 further comprising:
determining, by the HC storage provisioner, that the HC persistent volume object is no longer needed on the hosted cluster;
causing, by the HC storage provisioner, deletion of the IC volume metadata; and
causing, by the HC storage provisioner, deletion of the HC volume metadata.

6. The method of claim 1 further comprising:
determining, by a hosted cluster (HC) control plane, that a persistent volume claim seeking a persistent volume based on a particular storage class has been created;
determining, by the HC control plane, that the HC storage provisioner services the particular storage class; and
sending, to the HC storage provisioner, the request to dynamically provision the HC persistent volume object that is coupled to the physical storage.

7. The method of claim 1 wherein the IC volume metadata comprises the IC persistent volume object and an IC persistent volume claim object that identifies a quantity of storage identified in the request to dynamically provision the HC persistent volume object.

8. The method of claim 7 wherein the HC volume metadata comprises an HC persistent volume object and an HC persistent volume claim object that identifies the quantity of storage identified in the request to dynamically provision the HC persistent volume object.

9. The method of claim 1 wherein the IC comprises a master node computing device and a plurality of worker node computing devices.

10. The method of claim 9 wherein the hosted cluster comprises a master node virtual machine that executes on one of the plurality of worker node computing devices, and a plurality of worker node virtual machines that execute on one or more of the worker node computing devices.

11. The method of claim 10 wherein the IC comprises a first Kubernetes cluster and the hosted cluster comprises a second Kubernetes cluster.

12. The method of claim 1 wherein the HC storage provisioner comprises a container storage interface driver.

13. The method of claim 1 wherein the hosted cluster is configured such that the hosted cluster can only access the physical storage via the IC.

14. A computing device, comprising:
a memory; and
a processor device coupled to the memory to:
receive, via a hosted cluster (HC) storage provisioner executing in a hosted cluster that is hosted by an infrastructure cluster (IC), a request to dynamically provision a hosted cluster (HC) persistent volume object that is coupled to a physical storage for use by a virtual machine in the hosted cluster;
cause, by the HC storage provisioner, an IC control plane executing on the IC to generate IC volume metadata that is backed by a storage volume on the physical storage, the IC volume metadata comprising an IC persistent volume object that represents a persistent volume for use by the IC;
determine, by the HC storage provisioner, that the IC volume metadata has been generated; and
create, by the HC storage provisioner, HC volume metadata on the hosted cluster that is linked to the IC volume metadata, the HC volume metadata comprising an HC persistent volume object that represents a persistent volume for use by the hosted cluster that is backed, via the IC volume metadata, by the physical storage.

15. The computing device of claim 14, wherein the processor device is further to:
receive, by the HC storage provisioner, a request to attach the HC persistent volume object to a particular virtual machine of a plurality of virtual machines executing on the hosted cluster; and
cause, by the HC storage provisioner, the IC control plane to hot-plug the IC persistent volume object into the particular virtual machine via the IC volume metadata, such that the particular virtual machine obtains a new volume that is backed by the storage volume on the physical storage.

16. The computing device of claim 15, wherein the processor device is further to:
determine, by the HC storage provisioner, that the new volume is to be detached from the particular virtual machine; and
cause, by the HC storage provisioner, the IC control plane to hot-unplug the IC persistent volume object from the particular virtual machine via the IC volume metadata, such that the particular virtual machine no longer has the new volume that is backed by the storage volume on the physical storage.

17. The computing device of claim 14, wherein the processor device is further to:
determine, by a hosted cluster (HC) control plane, that a persistent volume claim seeking a persistent volume based on a particular storage class has been created;
determine, by the HC control plane, that the HC storage provisioner services the particular storage class; and
send, to the HC storage provisioner, the request to dynamically provision the HC persistent volume object that is coupled to the physical storage.

18. A non-transitory computer-readable storage medium that includes executable instructions to cause a processor device to:
receive, via a hosted cluster (HC) storage provisioner executing in a hosted cluster that is hosted by an infrastructure cluster (IC), a request to dynamically provision a hosted cluster (HC) persistent volume object that is coupled to a physical storage for use by a virtual machine in the hosted cluster;
cause, by the HC storage provisioner, an IC control plane executing on the IC to generate IC volume metadata that is backed by a storage volume on the physical storage, the IC volume metadata comprising an IC persistent volume object that represents a persistent volume for use by the IC;
determine, by the HC storage provisioner, that the IC volume metadata has been generated; and
create, by the HC storage provisioner, HC volume metadata on the hosted cluster that is linked to the IC volume metadata, the HC volume metadata comprising an HC persistent volume object that represents a persistent volume for use by the hosted cluster that is backed, via the IC volume metadata, by the physical storage.

19. The non-transitory computer-readable storage medium of claim 18, wherein the instructions further cause the processor device to:
receive, by the HC storage provisioner, a request to attach the HC persistent volume object to a particular virtual machine of a plurality of virtual machines executing on the hosted cluster; and
cause, by the HC storage provisioner, the IC control plane to hot-plug the IC persistent volume object into the particular virtual machine via the IC volume metadata, such that the particular virtual machine obtains a new volume that is backed by the storage volume on the physical storage.

20. The non-transitory computer-readable storage medium of claim 19, wherein the instructions further cause the processor device to:
determine, by the HC storage provisioner, that the new volume is to be detached from the particular virtual machine; and
cause, by the HC storage provisioner, the IC control plane to hot-unplug the IC persistent volume object from the particular virtual machine via the IC volume metadata, such that the particular virtual machine no longer has the new volume that is backed by the storage volume on the physical storage.

* * * * *